United States Patent [19]

Mullin

[11] Patent Number: 4,586,300
[45] Date of Patent: May 6, 1986

[54] BUILDING CONSTRUCTION

[76] Inventor: Edward L. Mullin, 307 Quaker Rd., Sewickley, Pa. 15143

[21] Appl. No.: 546,540

[22] Filed: Oct. 28, 1983

[51] Int. Cl.$^4$ .............................................. E04B 7/00
[52] U.S. Cl. ........................................ 52/93; 52/646; 403/189; 403/345
[58] Field of Search .................. 52/93, 646, 285, 721; 403/189, 345; 5/290, 295; 446/127

[56] References Cited

U.S. PATENT DOCUMENTS

| | | | |
|---|---|---|---|
| 1,178,338 | 4/1916 | Niernsee | 52/93 |
| 2,008,087 | 7/1935 | Stromberg | 403/345 |
| 2,793,407 | 5/1957 | Johnston | 403/345 |
| 3,132,443 | 5/1964 | Kuhn | 446/127 |
| 3,397,496 | 8/1968 | Sohns | 52/286 |
| 4,041,659 | 8/1977 | McElhoe | 52/93 |
| 4,270,324 | 6/1981 | Schaefer | 52/285 |
| 4,275,534 | 6/1981 | Porter | 52/721 |

FOREIGN PATENT DOCUMENTS

| | | | |
|---|---|---|---|
| 335677 | 4/1921 | Fed. Rep. of Germany | 5/295 |
| 2634179 | 2/1978 | Fed. Rep. of Germany | 403/189 |
| 1071513 | 3/1954 | France | 5/290 |
| 1287204 | 1/1962 | France | 52/646 |
| 1386121 | 12/1964 | France | 52/283 |

Primary Examiner—James L. Ridgill, Jr.
Attorney, Agent, or Firm—Webb, Burden, Robinson & Webb

[57] ABSTRACT

Apparatus for connecting together two structural elements of a building framework which includes a slot portion attached to one of the structural elements at a location where the two elements are to be connected together and a wedge portion attached to the other structural element. The wedge portion is moved within the slot portion until the slot and wedge portions securely engage each other and join the two structural elements together. A building constructed of elements joined together solely by means of the slot and wedge portions is also disclosed.

13 Claims, 22 Drawing Figures

BUILDING CONSTRUCTION

DESCRIPTION

FIELD OF THE INVENTION

This invention pertains to a building construction and more particularly to a building which may be quickly and easily assembled and disassembled.

BACKGROUND ART

Buildings which are quickly and easily assembled, either temporary buildings or more permanent structures, and can be quickly and easily disassembled have been in existence for quite a number of years. Such buildings are also referred to as throw-up/knock-down buildings. Typically, the framework of a throw-up/knock-down building is constructed of a number of building columns, bracing girts, roof rafters, and bracing roof purlins which are joined together by bolts or screws or the like. Then a covering of a plurality of roof and wall panels are secured to the framework, again by bolts or screws or the like.

While it is not too difficult to construct such a building, it is often rather time consuming due to all the bolts and/or screws which must be fastened and tightened down. It may also be difficult to disassemble the building if the fasteners become frozen or rusted solid. The use of numerous loose and separate fasteners is another disadvantage because it requires the handling of many parts in addition to the basic framework and panelling for the building and if the fasteners are lost or otherwise separated from the building (which is not an uncommon occurrence during shipment) it becomes impossible to construct the building.

Accordingly, it is an object of the present invention to provide a building which is constructed using only a hammer or the like to join the various building parts together.

It is another object of the present invention to provide a building in which the means for joining the various building parts together are not separate elements but are incorporated directly into the building parts.

SUMMARY OF THE INVENTION

Accordingly, I have invented an apparatus for connecting together two structural elements of a building framework which includes a slot portion attached to a first of the structural elements at a location where the structural elements are to be connected together and a wedge portion attached to a second of the structural elements. The wedge portion is adapted to be moved within the slot portion until the slot portion and wedge portion securely engage each other and join the two structural elements together. The wedge portion preferably includes a wedge which is a flat plate of the same approximate thickness of the slot portion and in the shape of a trapezoid with two right angles adjacent each other. The wedge includes a straight edge and a sloped edge opposite each other whereby the wedge decreases in width from one end to the other. The slot portion preferably includes a straight slot portion and a sloped slot portion spaced apart and in opposition to each other, with the straight slot portion including a straight edge which extends upwardly from the first structural element and faces the sloped slot portion and with the sloped slot portion including a sloped edge which extends upwardly from the first structural element and faces said straight slot portion. The straight edge and the sloped edge define a slot therebetween whose width decreases from one end of the slot to the other and is adapted to receive the wedge. When the wedge is engaged in the slot the straight edges of the wedge and of the straight slot portion are in engagement and the sloped edges of the wedge and of the sloped slot portion are in engagement.

The slot portion may include a first plate connected to the straight slot portion which extends beyond the straight edge of the straight slot portion toward the sloped slot portion and a second plate connected to the sloped slot portion which extends beyond the sloped edge of the sloped slot portion toward the straight slot portion. The first plate and second plate are spaced apart to form an opening therebetween. The wedge may be connected directly to the structural element or to a structural plate which is connected to the structural element. If the first and second plates are used, the wedge is connected to a filler plate and the filler plate is positioned within the opening between the first and second plates when the wedge is positioned within the slot. The slot portion may also include a cover plate which is attached to the straight slot portion and the sloped slot portion and completely covers the slot. The wedge is positioned within the area bounded by the structural element, the straight slot portion, the sloped slot portion and the cover plate.

I have also invented a building construction which includes a plurality of upright columns, girts, roof rafters, purlins and bracing struts connected together by means of my connecting apparatus discussed above.

DETAILED DESCRIPTION OF THE DRAWINGS

Figure 1:
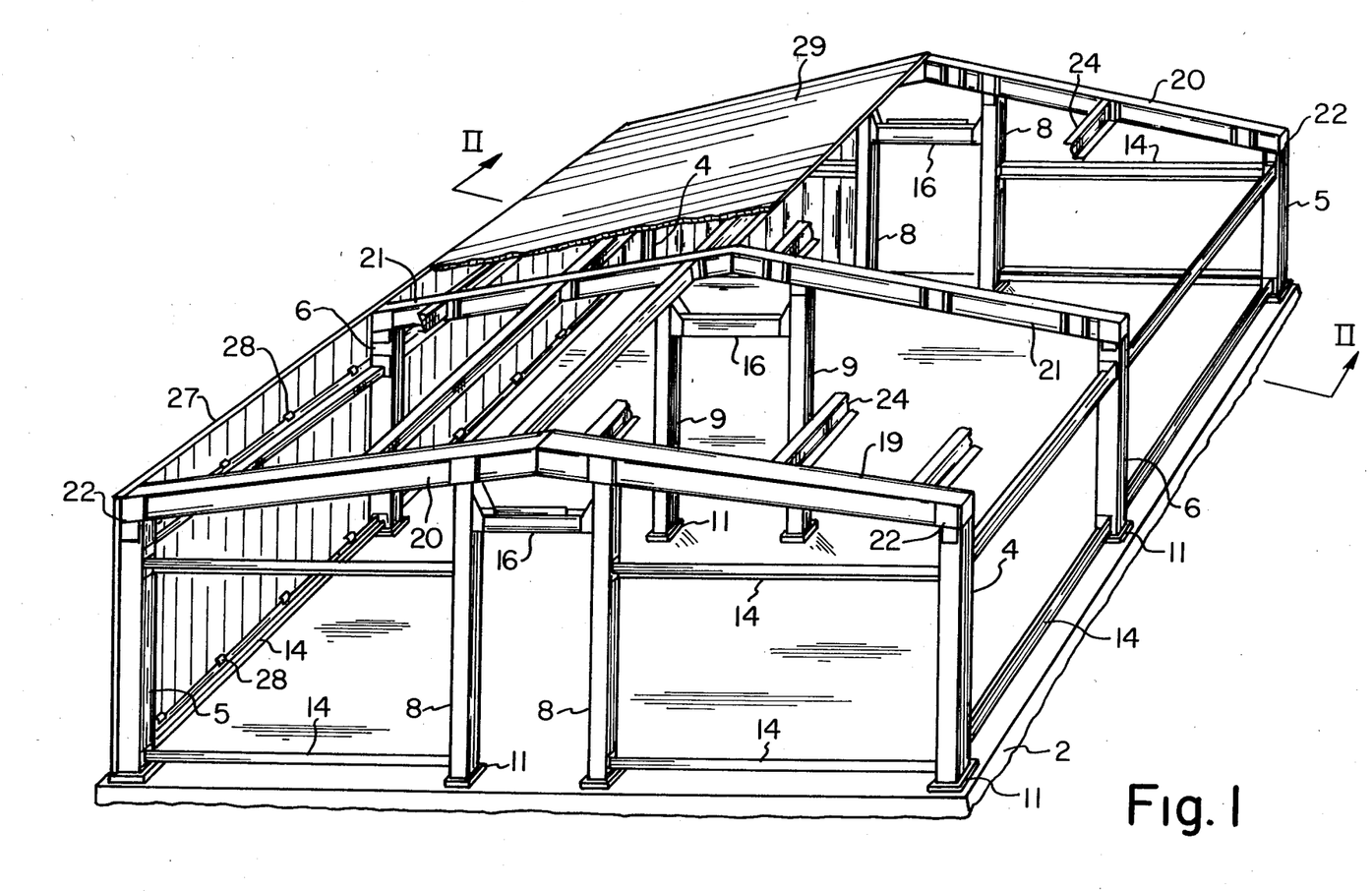
FIG. 1 is a perspective view of a partially completed building constructed in accordance with the present invention.
Figure 2:
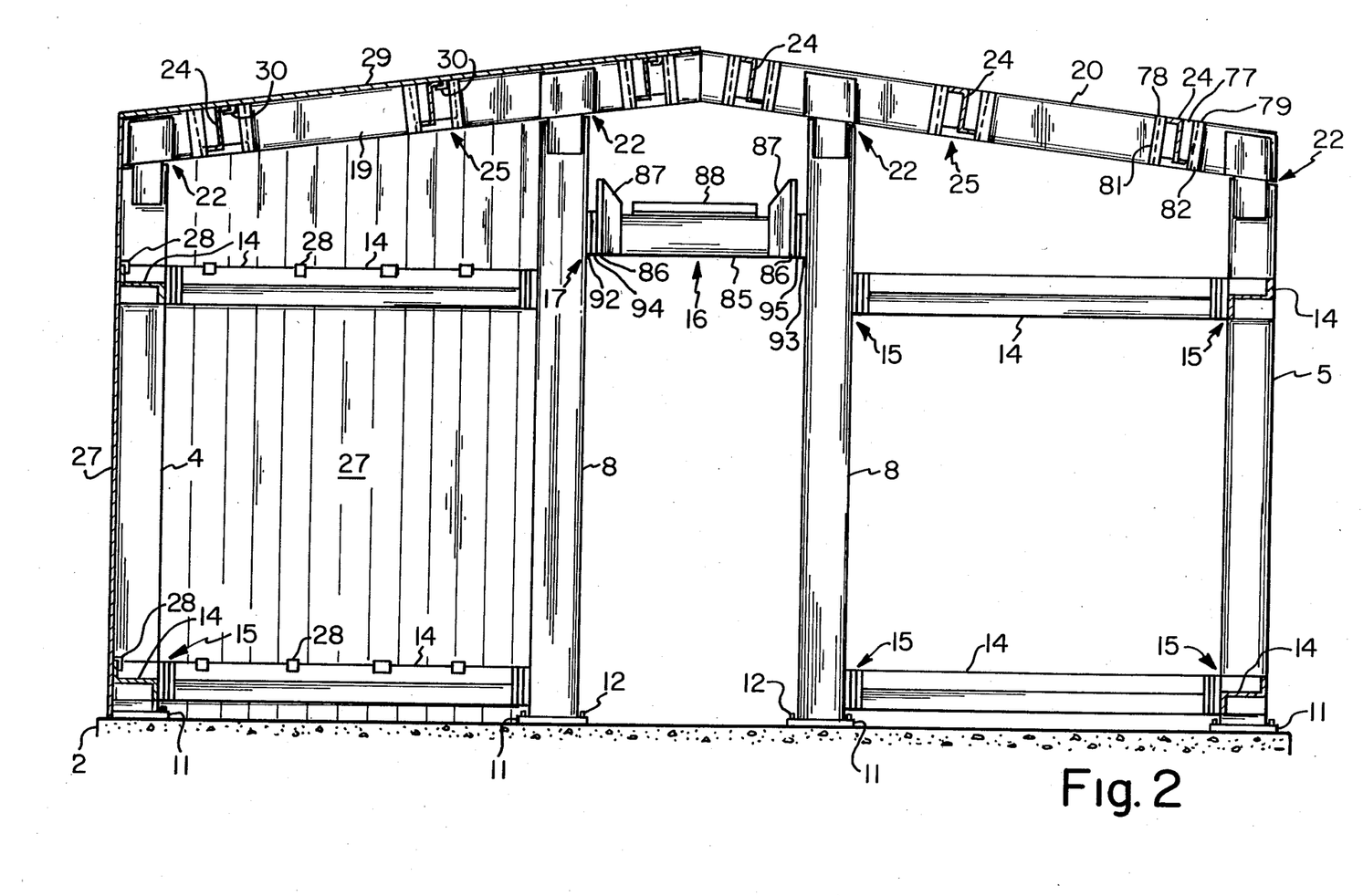
FIG. 2 is a section taken along line II—II in FIG. 1.
Figure 3:
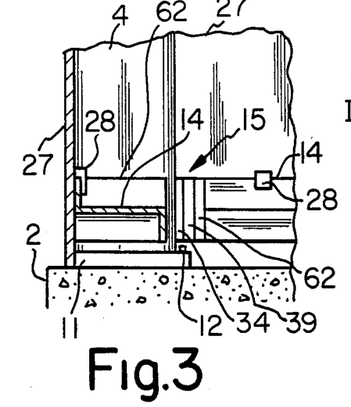
FIG. 3 is an enlarged portion of the sectional drawing of FIG. 2.
Figure 4:
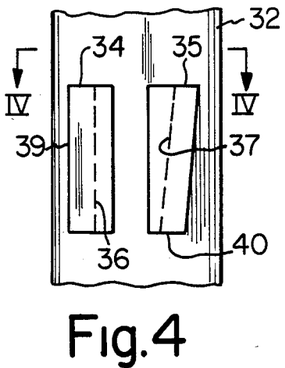
FIG. 4 is a side elevational view of a portion of an upright column showing a slot connector in accordance with the present invention.

A building constructed in accordance with the present invention is shown in FIGS. 1 and 2 and details of the various structural elements of the building are shown in FIGS. 3–22.

As shown in FIGS. 1 and 2, the entire building is placed on top of a concrete pad 2 or the like. Although it is preferable to use one large concrete pad 2 as shown, smaller individual pads may be utilized under the various contact points or the building may be placed directly on the ground. The building framework is constructed of a plurality of upright columns, girts, roof rafters, purlins and bracing struts joined together. The upright columns may be bolted to concrete pad 2, but, as will be explained hereinafter in more detail, the remaining framework elements are joined together by merely hammering the elements together with the use of a unique connection means and without the use of any bolts, screws, or the like. Once the framework is constructed, roof and building panels are secured thereto by means of fastening clips, again without the use of any bolts, screws or the like.

The building includes a plurality of outer upright columns, namely, corner column 4, corner column 5 and wall column 6, all of similar construction and of the same height. The building also includes a plurality of inner upright columns, namely, inner column 8 and inner column 9, all of similar construction and of the same height. The inner columns have a somewhat greater height than the outer columns to provide for a sloping roof. Corner columns 4, corner columns 5, wall columns 6 and inner columns 8 are spaced about the exterior periphery of the building and inner columns 9 are positioned in the interior of the building as is done in a typical building constructed from a structural framework. While a building utilizing only six outer columns and six inner columns is shown in FIG. 1, it is to be understood that a building of any size could be constructed according to the present invention by utilizing a greater or lesser number of upright columns appropriately arranged.

Each upright column has a support plate 11 secured to its bottom which permits the columns to be secured to the concrete pad 2 by bolts 12 or the like.

One or more structural girts 14 are provided between adjacent pairs of outer columns and are secured thereto by a girt to column connector 15 which is described herein after in detail. Similarly, one or more structural girts 14 are provided between adjacent pairs of inner columns 8 and corner columns 4, 5 and are secured thereto by connector 15. Two girts 14 are shown mounted between each pair of columns, one mounted near the bottom of each column and the other mounted near the top of each column, however other arrangements and numbers of girts 14 may be utilized as desired. To provide additional open area in the interior of the building shown in the Figures, no girts 14 are included between adjacent pairs of wall column 6 and inner column 9 and adjacent pairs of the inner columns. If it were desired to partition the interior of the building, additional girts 14 would be used.

A bracing strut 16 is provided between adjacent pairs of inner columns 8 and between adjacent pairs of inner columns 9 and is secured thereto by a strut to column connector 17 which is described hereinafter in detail. Only one bracing strut 16 is shown mounted between each pair of columns and it is mounted near the top end of the inner columns in order to provide increased interior room in the building. Additional bracing struts may be used as desired.

A roof rafter is attached to the top of each adjacent pairs of inner and outer columns. Edge rafter 19 is attached to corner column 4 and inner column 8 and edge rafter 20 is attached to corner column 5 and inner column 8. A center rafter 21 is attached to wall column 6 and inner column 9. Each roof rafter is joined to the upright columns by a rafter to column connector 22 which is described hereinafter in detail. Each roof rafter spans the distance between the inner and outer columns and extends beyond the inner columns to a point about half way between the adjacent pairs of inner columns. In this manner, a continuous roof rafter surface is formed from one side of the building to the other and which slopes downwardly from the inner columns to the outer columns.

One or more roof purlins 24 are provided between adjacent roof rafters and are connected thereto by a purlin to rafter connector 25 which is described hereinafter in more detail. As shown in the Figures, three purlins 24 are connected between adjacent roof rafters, however a different number of roof purlins may be used if desired.

Once the framework of the building has been constructed, the exterior of the building is completed by attaching wall panels 27 over the upright columns and girts. Wall panels 27 are mounted to the girts 14 by means of a plurality of clips 28 which are welded or otherwise fastened to the inner face of the wall panels 27. Each wall panel 27 is installed by placing the panel 27 adjacent the framework slightly above its final, mounted location and moving the panel downward until clips 28 engage the girts 14. The roof panels 29 are secured in place over the roof rafters and purlins 24 by a plurality of clips 30 which are welded or otherwise fastened to the inner face of the roof panel 29 and which matingly engage the purlins 24. Each roof panel 29 is installed by placing the panel 29 on the roof framework above its mounted location and sliding the panel 29 downward until clips 30 engage the purlins 24. If clips 30 and the purlins 24 were oriented opposite to that shown, the roof panel 29 would be installed by placing it on the roof framework below its mounted location and sliding the panel upward until clips 30 engage the purlins 24. The wall and roof panels are preferably constructed with the desired windows, doors, or the like built therein.

The key feature of the present invention is the various connectors used to join together the different structural elements of the building framework, namely, the girt to column connector 15, the strut to column connector 17, the rafter to column connector 22 and the purlin to rafter connector 25. Each of these connectors are very similar and includes a slot portion and a wedge portion. The slot portion is adapted to receive the wedge portion in a secure mating relationship in order to join the two portions together and form the connector. The wedge portion is mounted to one structural element and the slot portion is mounted to another structural element to be joined thereto. The wedge portion of one structural element is positioned adjacent the slot portion of the other structural element and the wedge portion is hammered or otherwise forced into the slot portion until the wedge portion is tightly secured therein. Thus, the two structural elements are joined together by the use of only a hammer or the like. To separate the two elements, it is necessary to merely hammer or move the wedge portion in the opposite direction and remove it from the slot portion.

The girt to column connector 15 and its operation is shown in more detail in FIGS. 4–7. The column 32 shown in FIGS. 4–7 is representative of all the upright columns and includes, for illustrative purposes, means for connecting only one girt thereto. Column 32 is rectangular in cross section with substantially flat outer surfaces, although other column configurations may be utilized for the various upright columns. Column 32, as well as the remaining structural elements of the building shown in the Figures, is preferably formed of a metal such as steel or the like. The slot portion of the girt to column connector 15 includes a straight slot portion 34 welded or otherwise secured to the column 32 and a sloped slot portion 35 spaced apart from and in opposition to the straight slot portion 34 and likewise welded or secured to the column 32. Both the slot portions 34, 35 extend upward on the surface of the column 32 and are substantially the same thickness. The straight slot portion 34 has a straight edge 36 which extends perpendicularly up from the column 32 and faces the sloped slot portion 35. The sloped slot portion 35 includes a sloped edge 37 facing the straight slot portion 34 which extends perpendicularly up from the column 32 and is angled toward the straight slot portion 34 and forms a space or slot 38 between straight edge 36 and sloped edge 37. The slot 38 opens upwardly and the width of slot 38 decreases from the top to the bottom of the slot portion of the girt to column connector 15. The slot portions 34, 35 may also be welded to a plate which is then welded to the column 32 rather than being welded directly to the column 32 as shown. The straight slot portion 34 is preferably formed of a rectangular plate aligned along the vertical axis of column 32 and the sloped slot portion 35 is preferably formed of a rectangular plate which, at its top, is angled away from the vertical axis of column 32 to form sloped edge 37 and to provide a slot 38 which decreases in width. Slot portions 34, 35 are preferably formed of metal.

A flat plate 39 may be secured on top of straight slot portion 34 and a similar flat plate 40, of substantially the same thickness as plate 39, may be secured on top of sloped slot portion 35. Plate 39 extends a short distance beyond straight edge 36 toward plate 40 and, likewise, plate 40 extends a short distance beyond sloped edge 37 toward plate 39. However, plate 39 and plate 40 do not touch and are spaced apart from one another to form therebetween opening 41 of substantially constant width. The purpose of plates 39 and 40 and opening 41 will be explained hereinafter in detail. Plates 39, 40 are preferably formed of metal.

Figure 6:
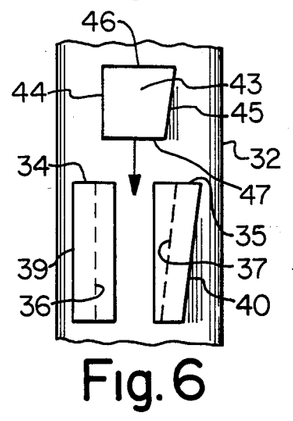
FIG. 6 is a side elevational view of a portion of an upright column showing a wedge connector positioned above the slot connector.
Figure 7:
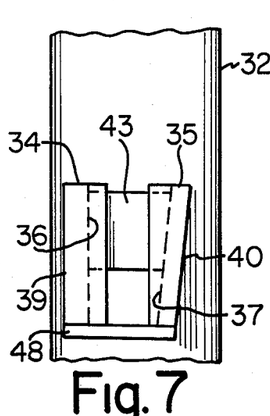
FIG. 7 is a side elevational view of a portion of an upright column showing the wedge connector joined to the slot connector.

The wedge portion 43 of the girt to column connector 15 is shown in FIGS. 6 and 7. The wedge portion 43 is welded to a girt 14, either directly or via additional elements as discussed hereinafter; however, for illustration purposes the girt 14 is not shown. Wedge 43 is a flat, preferably metal plate, of the same approximate thickness as the slot portions 34, 35 and is in the shape of a trapezoid with two right angles adjacent each other. Wedge 43 includes straight edge 44 and sloped edge 45 opposite each other such that the width of wedge 43 decreases from its top edge 46 to its bottom edge 47. The angle of sloped edge 45 on wedge 43 is substantially the same as the angle of sloped edge 37 on sloped portion 35.

Figure 5:
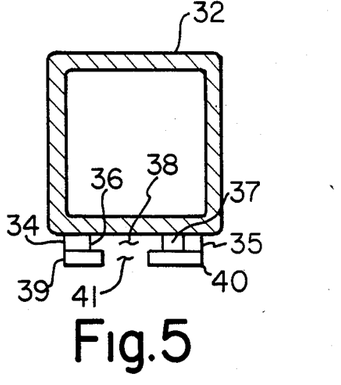
FIG. 5 is a section taken along line IV—IV in FIG. 4.

To join wedge 43 to the slot portion, wedge 43 is moved downwardly into slot 38 with straight edge 44 of wedge 43 adjacent straight edge 36 of straight slot portion 36 and with sloped edge 45 of wedge 43 adjacent sloped edge 37 of sloped slot portion 35 as shown by the arrow in FIG. 5. If wedge 54 is sized appropriately, straight edges 36 and 44 and sloped edges 37 and 45, of the slot portion and wedge 43, respectively, will come into contact and prevent wedge 43 from moving any further within the slot 38 as shown in FIG. 7. Applying sufficient force to the wedge 43, such as by hammering or the like, will securely fasten wedge 43 within slot 38. A stop 48 may be provided at either the bottom of slot 38 as shown in FIG. 7 or within slot 38. Stop 48 restricts the movement of wedge 43 within slot 38 and prevents the wedge/slot connection from being too tight.

Figure 8:
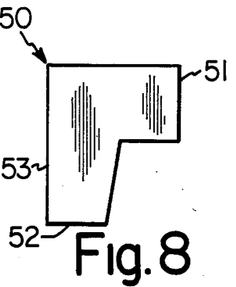
FIG. 8 is a side view of an alternate embodiment of the wedge connector shown in FIGS. 6 and 7.
Figure 9:
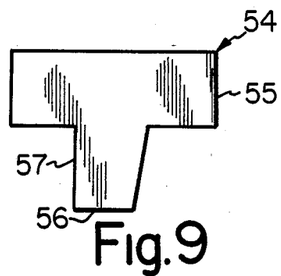
FIG. 9 is a side view of an alternate embodiment of the wedge connector shown in FIGS. 6 and 7.

Alternate embodiments of a wedge are shown in FIGS. 8 and 9. Wedge 50, shown in FIG. 8, includes a rectangular portion 51 with a narrower wedge portion 52 extending downwardly therefrom and with straight edge 53 of wedge portion 52 aligned along one side of rectangular portion 51. Wedge 54, shown in FIG. 9, includes a rectangular portion 55 with a narrower wedge portion 56 extending downwardly therefrom and with straight edge 57 set back from the edge of rectangular portion 55. Wedge portion 52 and wedge portion 56 are similar in shape and appearance to wedge 43 discussed above and are adapted to fit within a slot portion of a connector. Rectangular portions 51 and 55 will remain outside of the slot portion and function to limit the movement of wedge portions 52 and 56 within the slot. Also, wedge 50 and wedge 54 may be secured to a building structural element by welding or otherwise securing the rectangular portions 51 and 55 to that structural element.

A wedge with two, rather than one, sloped edges could also be used in conjunction with a slot portion with two sloped edges and would function in the same manner as described above. However, the use of a single sloped edge makes for a tighter connection and the vertical or straight edge helps to align the wedge within the slot in the proper position. A connector with only one sloped edge on the wedge and slot portion provides the necessary strength for the building construction but is also much easier to disassemble than a connector with two sloped edges. Therefore, the connector shown in FIGS. 4–7 is preferred over a connector with two sloped edges.

Figure 10:
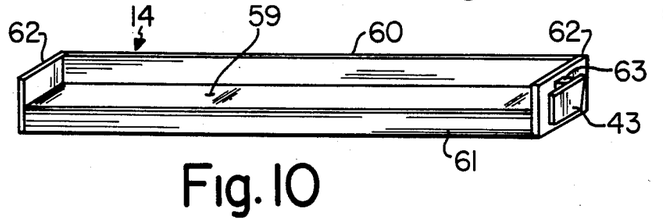
FIG. 10 is a perspective view of a girt in accordance with the present invention.
Figure 11:
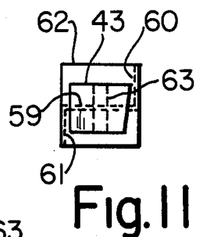
FIG. 11 is an end view of the girt shown in FIG. 9.

One embodiment of a girt 14 is shown in FIGS. 10 and 11. Girt 14 as shown is made of a flat piece of light gauge steel and is bent or molded with a central flat portion 59 and with an upward flange 60 and a downward flange 61 extending outwardly from the outer edges of central portion 59 in opposite directions. However, girt 14 could be made of other designs, shapes, thicknesses or materials. When the girt 14 is mounted in position on the building, upward flange 60 is oriented toward the outside of the building and is adapted to receive clips 28 of wall panels 27 as discussed above. A structural plate 62 is attached to both ends of the girt 14 and wedge 43 is attached to a narrower filler plate 63 which is in turn connected to plate 62. Filler plate 63 is sandwiched in between plate 62 and wedge 43 and raises wedge 43 up from the surface of plate 62. Alternatively, wedge 43 could be attached directly to plate 62 or wedge 43 could be attached directly to the ends of girt 14 by eliminating plate 62.

Figure 12:
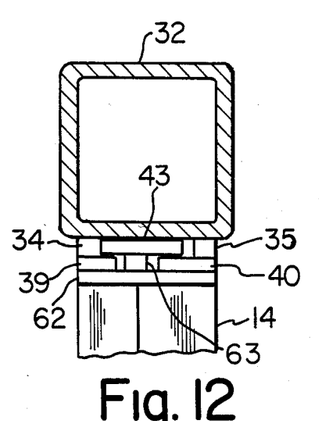
FIG. 12 is the sectional view of an upright column showing a girt mounted thereto.

A girt 14 connected to a column 32 is shown in detail in FIG. 12. Wedge 43 is located within the area (slot 38, not visible) bounded by the column 32, straight slot portion 34, sloped slot portion 35, plate 39 and plate 40. The girt 14 is secured to the column 32 primarily by securely forcing wedge 43 between slot portions 34 and 35 until wedge 43 cannot move downward any further and is lodged therebetween. As can be seen in FIG. 12, plate 39 and plate 40 both extend over wedge 43 and prevent wedge 43, and consequently the girt 14, from being moved perpendicularly away from column 32. Thus, wedge 43 is securely fastened within slot portions 34 and 35 and girt 14 is securely fastened to column 32. Filler plate 63 functions to space plate 62 on girt 14 away from wedge 43 a sufficient distance to avoid interference with plates 39 and 40. Filler plate 63 is narrower than and fits within the opening 41 between plate 39 and plate 40.

Figure 13:
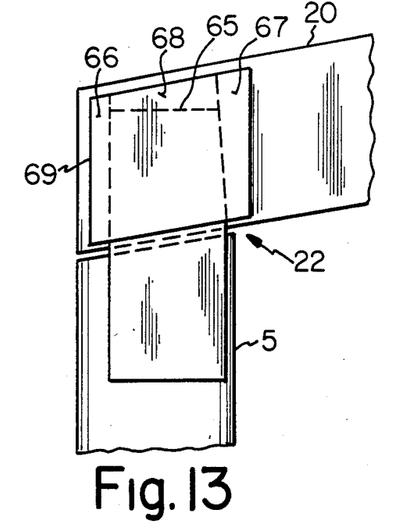
FIG. 13 is a side view of a portion of an upright column and a roof rafter joined together.
Figure 14:
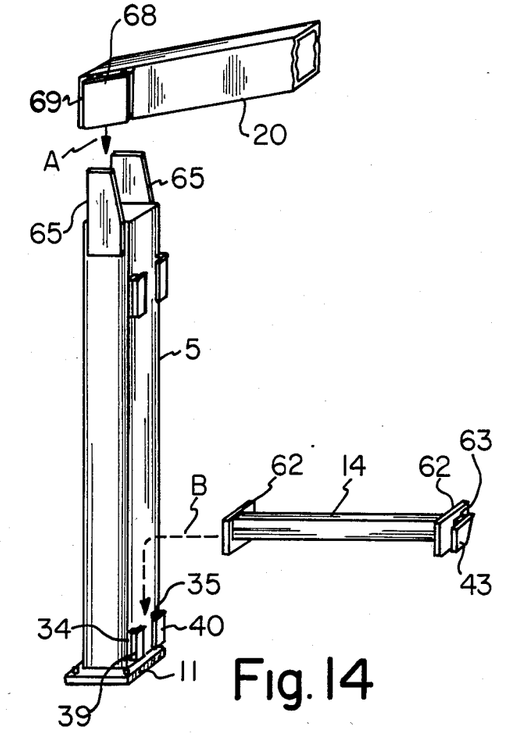
FIG. 14 is a perspective view of an upright column showing a roof rafter and a girt being mounted thereto.

FIGS. 13 and 14 show a rafter to column connector 22 on corner column 5. The rafter to column connector 22 includes wedge 65 which is welded on opposite sides of column 5 and extends upwardly beyond the top of column 5. Straight slot portion 66 and sloped slot portion 67 of connector 22 are welded on opposite sides of rafter 20 and oriented such that slot 68 formed therebetween opens downwardly to receive wedge 65 when rafter 20 is moved downwardly toward column 5 as shown by the arrow marked A in FIG. 14. The rafter to column connector 22 also includes a cover plate 69 which is welded to and covers straight slot portion 66, sloped slot portion 67 and slot 68. Wedge 65 fits securely within the space bounded by rafter 20, plate 69, straight slot portion 66 and sloped portion 67 to rigidly join rafter 20 to column 5. While two wedges 65, opposed from each other, are shown, with corresponding slot portions, other arrangements may be utilized. As shown in FIG. 14, rafter 20, as well as all the roof rafters, is preferably of rectangular cross section. However, any other rafter configuration could be used.

Figure 15:
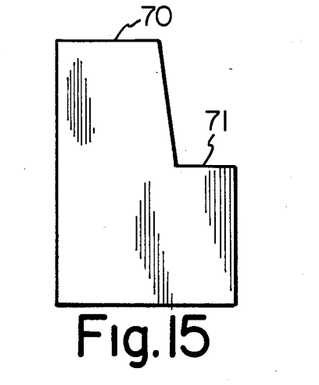
FIG. 15 is a side view of an alternate embodiment of the wedge shown in FIGS. 13 and 14.

An alternate embodiment for a wedge 70 for the rafter to column connector 22 is shown in FIG. 15. Wedge 70 is similar to wedge 65 discussed above except that wedge 70 includes an additional notch portion 71. Notch 71 restricts the travel of wedge 70 within slot 68 and prevents an unduly tight connection between the columns and rafters.

Referring again to FIG. 14, corner column 5 has a number of slot portions 34 and 35 and associated plates 39 and 40 welded thereto. The slot portions 34 and 35 are spaced apart as discussed above and are adapted to receive wedge 43 attached to girt 14 as shown by the arrow marked B in FIG. 14. The inner and outer columns are all similar in construction to corner column 5 shown in FIG. 14 and include a plurality of slot portions 34 and 35 and one or more wedges 65 welded thereto in the appropriate location to receive the girts and roof rafters, respectively.

Figure 16:
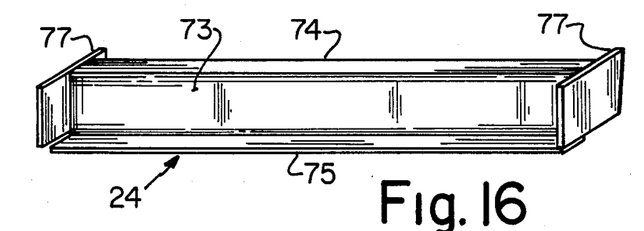
FIG. 16 is a perspective view of a roof purlin in accordance with the present invention.
Figure 17:
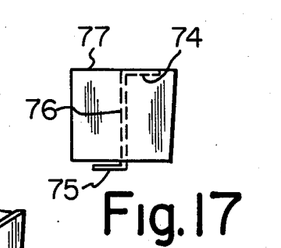
FIG. 17 is an end view of the roof purlin shown in FIG. 16.

One embodiment of a roof purlin 24 is shown in FIGS. 16 and 17. Purlin 24 is shaped similar to girt 14 with central portion 73 and upper flange 74 and lower flange 75 extending outwardly from opposite edges of central portion 73 in opposite directions. Upper flange 74 is oriented toward the peak of the roof of the building and is adapted to receive clips 30 of the roof panels 29 as discussed above. Other arrangements and designs for purlin 24 can be used as desired.

Referring now to FIGS. 2 and 18-20, there is shown in detail the roof rafters and the purlin to rafter connector 25. The purlin to rafter connector 25 is similar to the girt to column connector 15 discussed above in detail. Connector 25 includes wedge 77 attached directly to each end of purlin 24. Connector 25 also includes straight slot portion 78 and sloped slot portion 79 attached to the side of each roof rafter and oriented such that slot 80 formed therebetween opens upwardly to receive wedge 77 when purlin 24 is moved downwardly and joined to a roof rafter. Plate 81, similar to plate 39, may be attached to straight slot portion 78 and plate 82, similar to plate 40, may be attached to sloped slot portion 79. Opening 83, similar to opening 41, is formed between plate 81 and plate 82.

Figure 18:
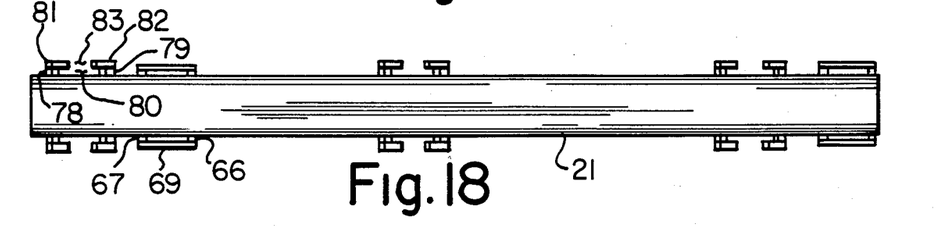
FIG. 18 is a top view of a center roof rafter in accordance with the present invention.
Figure 19:
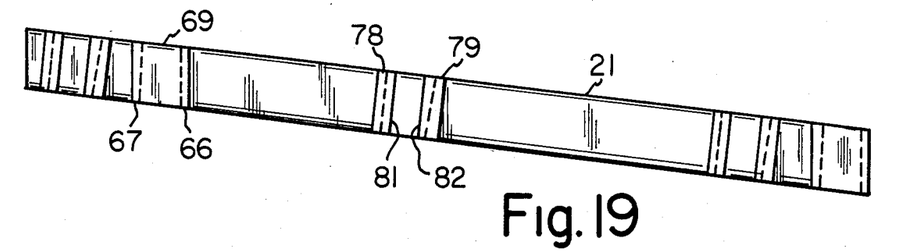
FIG. 19 is a side view of the center roof rafter shown in FIG. 18.
Figure 20:
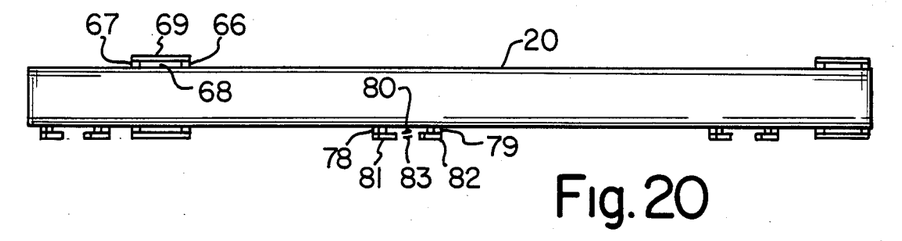
FIG. 20 is a top view of an edge roof rafter in accordance with the present invention.

The slot portions 78, 79 of connector 25, and accompanying plates 81, 82, are attached to the roof rafters wherever it is desired to attach a purlin 24. Center rafter 21 shown in FIGS. 18 and 19 includes slot portions 78, 79 of connector 25 on opposite sides since purlins 24 will be connected to rafter 21 on both sides. End rafter 20 shown in FIG. 20 includes slot portions 78, 79 and accompanying plates 81, 82, only on one side since the exterior side of end rafter 20 has no purlins attached thereto. Edge rafter 19 is identical to edge rafter 20 except that slot portions 78, 79 are on the opposite side of the rafter from that shown in FIG. 20. FIGS. 18-20 also show the placement on the rafter of the slot portions 66, 67 and plate 69 of the rafter to column connector 22.

In the embodiment shown in the Figures, wedge 77 alone is welded or otherwise secured to the end of the purlin 24 and wedge 77 is wider than the girt 24 and extends out beyond upper flange 74 and lower flange 75. As shown in FIG. 2, purlin 24 is narrower than and is positioned in between opening 83 formed between plate 81 and plate 82. Plate 81 and plate 82 overlap wedge 77 when it is wedged within slot 80 and prevent purlin 24 from moving outwardly away from the roof rafter.

Figures 21, 22:
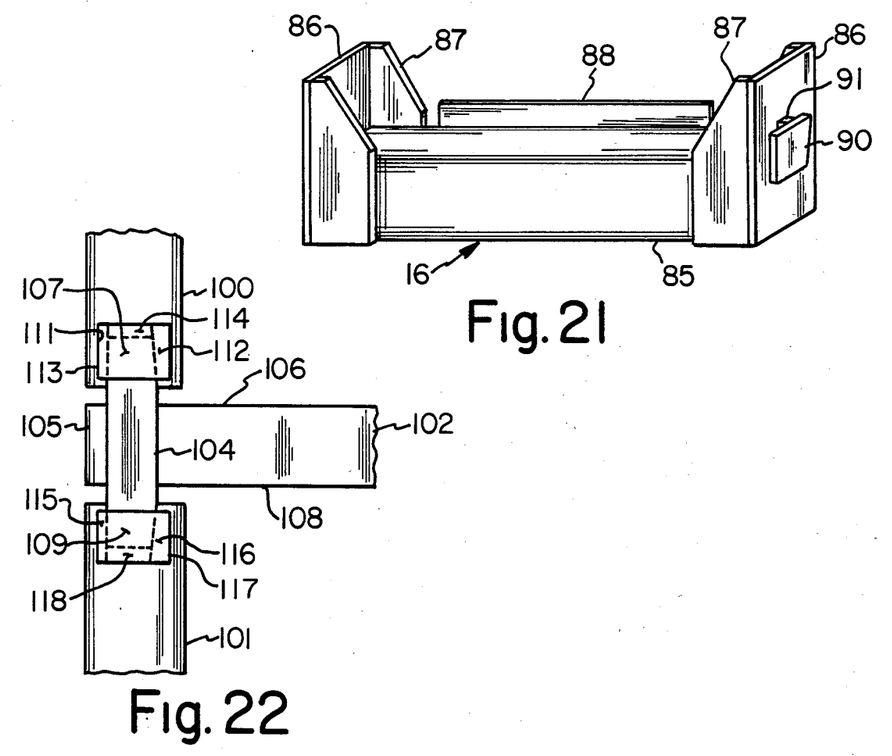
FIG. 21 is a perspective view of a bracing strut in accordance with the present invention.
FIG. 22 is a side view of an alternate embodiment of a two-part upright column with a floor beam attached thereto.

One embodiment of a bracing strut 16 is shown in FIG. 21. Bracing strut 16 includes a rectangularly shaped tube portion 85 with plate 86 attached to each end. Bracing plates 87 may be provided to more securely join plate 86 to tube portion 85. An additional upwardly directed lip 88 may be attached to bracing struts 16 positioned along an exterior wall of the building. This lip 88 is adapted to receive clips 28 attached to the wall panels 27. Although a rectangularly shaped tube portion 85 is shown, other shapes or configurations may be utilized.

The bracing strut to column connector 17 is shown with reference to FIGS. 2 and 21. The bracing strut to column connector 17 is similar to the other connectors discussed above and includes wedge 90 attached to a filler plate 91 which is attached to plate 86. Filler plate 91 is sandwiched between and attached to both plate 86 and wedge 90. Connector 17 also includes straight slot portion 92 and sloped slot portion 93 attached to one surface of each of the inner columns 8, 9, and plate 94 attached to straight slot portion 92 and plate 95 attached to sloped slot portion 93. Wedge 90, filler plate 91 and the slot formed by straight slot portion 92, sloped slot portion 93, plate 94 and plate 95 are similar in shape and function to the girt to column connector 15 discussed above and serve to attach a bracing strut 16 between adjacent pairs of inner columns 8, 9.

As shown in FIG. 22, a two-story building may be constructed in accordance with the present invention by the use of a two-part upright column with a floor beam attached therebetween. The building cnstruction shown in FIG. 22 includes an upper column 100, a lower column 101 and a floor beam 102 disposed therebetween and extending perpendicularly away from upper column 100 and lower column 101. Although only a portion of upper column 100, lower column 101 and floor beam 102 is shown, upper column 100 extends upwardly to a roof rafter, lower column 101 extends downwardly to the ground or concrete pad and floor beam 102 extends between and is connected to an adjacent two-part upright column.

The means for joining upper column 100 and lower column 101 to floor beam 102 is similar to the rafter to column connector discussed above and includes, preferably, a pair of wedges 104 mounted near the end 105 of floor beam 102 on opposite sides of floor beam 102 from each other. Only one wedge 104 is visible in FIG. 22. Wedge 104 extends upwardly beyond the upper surface 106 of floor beam 102 and forms upper wedge 107 and wedge 104 extends downwardly below the lower surface 108 of floor beam 102 and forms lower wedge 109. Straight slot portion 111, sloped slot portion 112 and plate 113 are mounted to upper column 100 near its lower end and form slot 114. Straight slot portion 115, sloped slot portion 116 and plate 117 are mounted to lower column 101 near its upper end and form slot 118. Upper wedge 107 fits securely within slot 114 and lower wedge 109 fits securely within slot 118 to join upper column 100 and lower column 101, respectively, to floor beam 102. While two wedges 104, opposed from each other, are shown with corresponding slot portions, other arrangements may be utilized.

Upper column 100, lower column 101, and floor beam 102 are preferably of rectangular section. However, other configurations could be used. A building constructed with a two-part upright column and a floor beam would be completed by attaching appropriate floor decking to the floor beams.

While all of the connectors discussed above have shown the use of only one wedge and slot combination, except for the rafter to column connector 22 and the embodiment shown in FIG. 22, and these may include only one wedge/slot combination, it is to be understood that more than one wedge/slot combination could be used to join the various structural elements together. Also, if it is desired, the narrower end of the wedges, which is inserted first into the slots, may be slightly beveled or provided with rounded corners to facilitate the initial positioning of the wedge within the slot.

A single story building utilizing the present invention is constructed in the following manner. First two outer columns and two inner columns are laid flat on the ground spaced apart approximately as they will be in the finished building. Girts are than hammered into place between adjacent pairs of inner and outer columns, a bracing strut is hammered into place between the adjacent inner columns, and two roof rafters are hammered into place on top of the columns. This entire structure is then raised into an upright position and the bottom of the columns are bolted to the concrete pad, if desired. This process is repeated for the adjacent set of inner and outer columns. Then the girts joining together adjacent outer columns are hammered into place and the roof purlins extending between the roof rafters are hammered into place. The remainder of the building framework is constructed in the same manner. Then the roof and wall panels are slipped into place and held secure to the building framework by way of the plurality of clips. If a two-story building were being constructed, the first step of the process would entail connecting the columns to the floor beams and then proceeding as described above. Floor decking would be added once the framework was erected. If it is desired to tear the building down, it is only necessary to reverse the above process and hammer the various parts apart.

Other than the option of bolting the upright columns to the concrete pad, no parts or tools, other than a hammer, are needed to construct a building in accordance with the present invention. All the connection means are already fastened onto the various structural elements. The only thing a workman needs to do is position the elements in the proper arrangement and hammer them together. Such a building can be set up and taken down rapidly with little manpower and expense. It can be reassembled on another site quickly and economically.

Having described the preferred embodiment of the invention, it is to be understood that it may be otherwise embodied within the scope of the appended claims.

I claim:

1. A building having a first structural element of the building framework connected to a second structural element of the framework by means capable of withstanding sheer and moment loads said means comprising:

(a) a slot portion attached to the first structural element at a location where the first and second structural elements are to be connected together, said slot portion including a straight slot portion and a sloped slot portion spaced apart and in opposition to each other, said straight slot portion including a straight edge which extends upwardly from said first structural element and faces the sloped slot portion, said sloped slot portion including a sloped edge which extends upwardly from said first structural element and faces said straight slot portion, said straight edge and said sloped edge defining a slot therebetween whose width decreases from one end of the slot to the other and is adapted to receive a wedge, and (b) a wedge portion attached to the second structural element, said wedge portion being a flat plate of the same approximate thickness of said slot portion and in the shape of a trapezoid with two right angles adjacent each other, said wedge including a straight edge and a sloped edge opposite each other whereby said wedge decreases in width from one end to the other and when said wedge is engaged to said slot portion within the slot, the straight edges of the wedge and of the straight slot portion are in engagement and the sloped edges of the wedge and of the sloped slot portion are in engagement.

2. The apparatus of claim 1 wherein said wedge is connected to a structural plate which is connected to said second structural element.

3. The apparatus of claim 1 wherein said wedge is connected to a filler plate narrower than said wedge, which filler plate is connected to said second structural element, and wherein said filler plate is positioned within said opening between said first and second plates when said wedge is positioned securely within said slot portion.

4. The apparatus of claim 1, said slot portion further including a cover plate attached to said straight slot portion and said sloped slot portion and covering said slot, wherein said wedge is positioned securely within the area bounded by the first structural element, the straight slot portion, the sloped slot portion and said cover plate when the wedge is engaged within said slot.

5. The apparatus of claim 1, said slot portion further including a first plate connected to said straight slot portion which extends beyond the straight edge of said straight slot portion toward said sloped slot portion and said slot portion includes a second plate connected to said sloped slot portion which extends beyond the sloped edge of said sloped slot portion toward said straight slot portion, whereby said first plate and second plate are spaced apart to form an opening therebetween.

6. The apparatus of claim 3 wherein said filler plate is connected to a structural plate and said structural plate is connected to said second structural element such that said filler plate is positioned in between said wedge and structural plate.

7. In a building including a plurality of upright columns, girts, roof rafters, purlins, bracing struts, or other structural elements joined together to form a building framework, the improvement comprising an apparatus for connecting together a first of said structural elements of the building framework to a second of said structural elements of the building framework which includes:

(a) a slot portion attached to the first structural element at a location where the first and second structural elements are to be connected together, said slot portion including a straight slot portion and a sloped slot portion spaced apart and in opposition to each other, said straight slot portion including a straight edge which extends upwardly from said first structural element and faces the sloped slot portion, said sloped slot portion including a sloped edge which extends upwardly from said first structural element and faces said straight slot portion, said straight edge and said sloped edge defining a slot therebetween whose width decreases from one end of the slot to the other and is adapted to receive a wedge, and (b) a wedge portion attached to the second structural element, said wedge portion being a flat plate of the same approximate thickness of said slot portion and in the shape of a trapezoid with two right angles adajcent each other, said wedge including a straight edge and a sloped edge opposite each other whereby said wedge decreases in width from one end to the other and when said wedge is engaged to said slot portion within the slot, the straight edges of the wedge and of the straight slot portion are in engagement and the sloped edges of the wedge and of the sloped slot portion are in engagement.

8. The improvement of claim 7, said slot portion further including a cover plate attached to said straight slot portion and said sloped slot portion and covering said slot, wherein said wedge is positioned securely within the area bounded by the first structural element, the straight slot portion, the sloped slot portion and said cover plate when the wedge is engaged within said slot.

9. The improvement of claim 7 wherein said building includes one or more roof panels attached to the purlins and includes one or more wall panels attached to the girts.

10. The improvement of claim 7 wherein said wedge is connected to a structural plate which is connected to said second structural element.

11. The improvement of claim 7, said slot portion further including a first plate connected to said straight slot portion which extends beyond the straight edge of said straight slot portion toward said sloped slot portion and said slot portion includes a second plate connected to said sloped slot portion which extends beyond the sloped edge of said sloped slot portion toward said straight slot portion, whereby said first plate and second plate are spaced apart to form an opening therebetween.

12. The improvement of claim 11 wherein said wedge is connected to a filler plate narrower than said wedge, which filler plate is connected to said second structural element, and wherein said filler plate is positioned within said opening between said first and second plates when said wedge is positioned securely within said slot portion.

13. The improvement of claim 12 wherein said filler plate is connected to a structural plate and said structural plate is connected to said second structural element such that said filler plate is positioned between said wedge and structural plate.

* * * * *